July 24, 1962  L. V. SCHMIDT ETAL  3,045,954

LANDING GEAR TRIM COMPENSATION SYSTEM

Filed March 31, 1961  2 Sheets-Sheet 1

INVENTORS
LOUIS V. SCHMIDT
GALE D. HIXENBAUGH
BY

ATTORNEYS

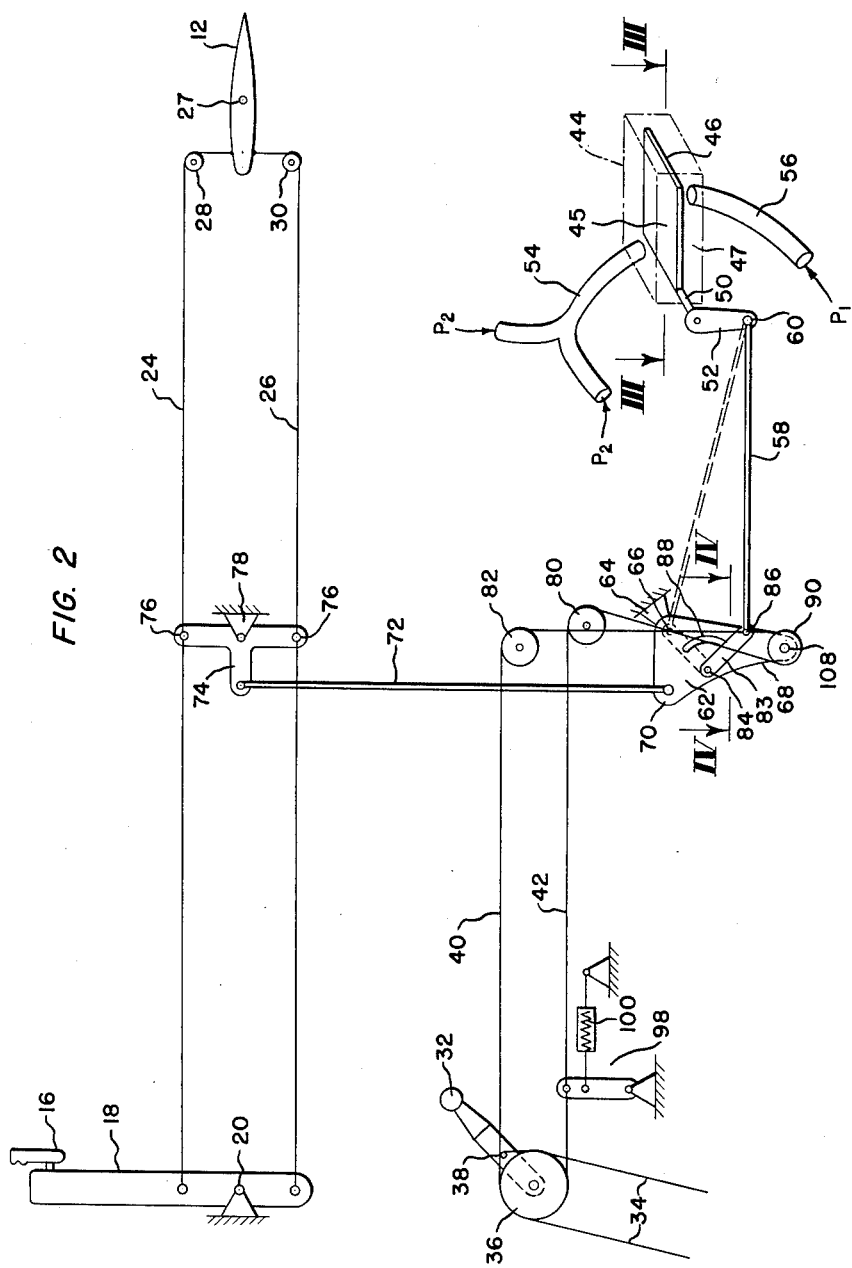

United States Patent Office 3,045,954
Patented July 24, 1962

3,045,954
LANDING GEAR TRIM COMPENSATION SYSTEM
Louis V. Schmidt, Alhambra, and Gale D. Hixenbaugh, San Diego, Calif., assignors to General Dynamics Corporation, San Diego, Calif., a corporation of Delaware
Filed Mar. 31, 1961, Ser. No. 99,737
9 Claims. (Cl. 244—76)

This invention relates to a landing gear trim compensation system and more particularly to a landing gear trim compensation system that introduces a corrective force into the longitudinal control system of an aircraft in flight when the landing gear is extended.

It is known that aircraft in flight, when lowering retractable landing gears in preparation for landing, experience a nose up condition. This condition requires the pilot to correct the attitude of flight of the aircraft through elevator controls or other means. At lower air speeds this nosing up condition of the aircraft can often be adequately corrected by the pilot through normal operation of the longitudinal control system. However, as air speeds of aircraft are increased, a large and disproportionate increase in the force causing the aircraft to nose up occurs. Thus in present day high-speed jet aircraft it has been found that the nosing up tendency of aircraft, when the landing gear is lowered at high airspeeds, creates a considerable problem to the pilot in keeping the aircraft in the desired attitude of flight. While the pilot in operating high speed aircraft can still endeavor to control the attitude of the aircraft through normal operation of the elevators, in so doing he is required to exert an excessive force against the elevator controls. This is especially true where the aircraft is of large size, such as in jet transport aircraft. Requiring the pilot to exert a disproportional force to maintain the in flight attitude of the aircraft is extremely burdensome to the pilot and tends to distract the pilot from other important flight control functions he is required to perform.

Accordingly, it is an object of this invention to provide an improved aircraft trim compensation system.

It is another object of this invention to provide an improved aircraft trim compensation system that assists the pilot of an aircraft in flight in maintaining a desired flight attitude when the landing gear is extended.

It is another object of this invention to provide a pressure actuated trim compensator that adds a substantial force to the longitudinal control system of an aircraft in flight only when the landing gear is extended.

It is another object of this invention to provide an improved aircraft trim compensation system that adds a substantial force to the longitudinal control system of an aircraft in flight when the landing gear is extended and adds substantially no drag on the longitudinal control system when the landing gear is raised.

It is another object of this invention to provide an improved aircraft trim compensator that adds a substantial force to the longitudinal control system of an aircraft in flight when the landing gear is extended which force is substantially proportional to the degree of nose up condition that results from the lowering of the landing gear.

The present invention is directed to a trim compensation system that utilizes the differential in air pressures occurring in air passing the airfoil surfaces of an aircraft, when the landing gear of the aircraft is lowered, to aid in correcting against the in flight movement of the aircraft to a nose up attitude. These pressure differentials are used to create a force that assists the pilot in utilizing the longitudinal control system of the aircraft to maintain the desired attitude of flight of the aircraft. It has been determined that the pressure of the air passing the airfoil surfaces of the aircraft, such as underneath the wing surfaces, experiences a change in pressure when the landing gear is lowered; while the static air pressure of the aircraft, which is that air pressure initially encountered by the aircraft in passing through the air, remains relatively constant. The static air pressure of the aircraft is the same as the air pressure indicated on the pilot's control panel. Thus, the differential of pressure used is that differential between the source of static air pressure of the aircraft and the source of air pressure underneath the control surfaces that experiences a change when the landing gear is lowered.

The separate air presures are received from appropriately placed pickup devices on the aircraft and applied to a pressure responsive means. The pressure responsive means creates a force proportional to the pressure differentials, which force is transmitted by a force transmitting means to the longitudinal control system of the aircraft. The longitudinal control system may be the system that controls the operation of the elevators in presently known aircraft. The force transmitting means is ineffective or in the "passive" position when the landing gear is retracted. Upon lowering the landing gear, the transmitting means is moved to an operative position by the landing gear control and is thus in a position to transmit a force to the longitudinal control system. When the landing gear is not extended, the pressure responsive means does not develop any appreciable force compensation. Further, the force transmitting linkage is so arranged that little or no drag on the normal operation of the longitudinal control system is incurred when the landing gear is in the retracted position.

While the differential in air pressure can create a force sufficient to move the elevators or longitudinal control surfaces that amount required to maintain the aircraft at the desired flight attitude, under the present system it is desirable to only create that force sufficient to aid the pilot in effecting the desired correction without having to exert extreme effort. Thus the pilot exerts only that force required to maintain a feel of the control of the aircraft.

Other objects and many of the attendant advantages of this invention will be readily appreciated as the same become better understood by reference to the following detailed description when considered in connection with the accompanying drawing in which like references designate like parts throughout the figures thereof and wherein:

FIGURE 2 shows diagrammatically the compensating system in conjunction with the elevator controls and the main landing gear controls;

Figure 1:
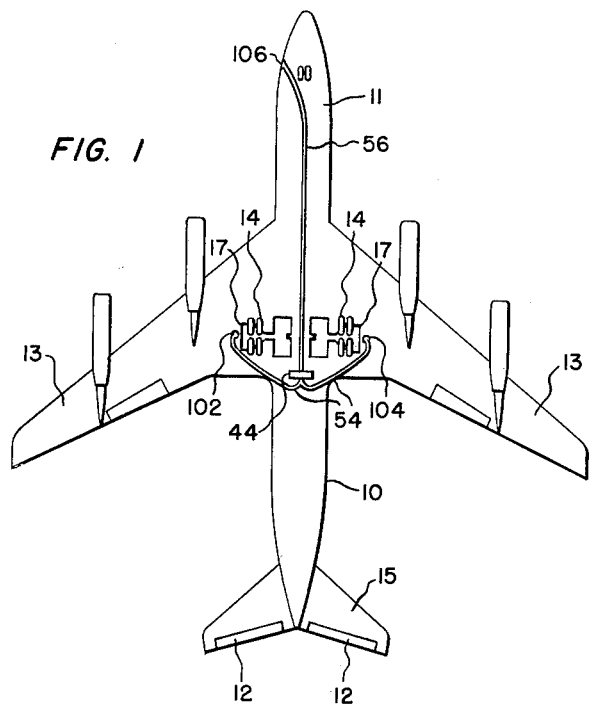
FIGURE 1 is a schematic of a bottom plan view of an aircraft having major portions of the invention embodied therein.

As shown in FIGURE 1 the airplane 10 has a fuselage 11, wings 13 and tail 15, and has retractable landing gears 14 that may be raised and lowered in a normal well-known manner through cut out areas 17. The landing gears 14 are shown in the lowered position. Elevators 12 are capable of controlling the longitudinal pitch of the aircraft in the normal manner. A flush orifice 106 for detecting the airplane static reference air pressure $P_1$ is positioned on the outer surface of the forward portion of the fuselage 11 of the aircraft 10. The airplane static reference air pressure $P_1$ is that pressure indicated on the pilot's control panel as is well-known in the aircraft art. Flush orifices 102 and 104 that detect the other air pressure $P_2$, are located on the outer surfaces of the under side of each respective wing 13 at a point outboard of the main landing gear cut out area 17. The orifices 102 and 104 are mounted flush to the surface of the wings 13 and detect the pressure of the still air or static type air at this point, as distinct from the dynamic pressure of the air moving over the wing surface which dynamic air pressure would be determined by pointing a Pitot tube upstream at this point. While orifices 102 and 104 may be positioned flush to the underside of the fuselage 11, or flush to other underneath surfaces of the aircraft that experience a change in the pressure of the air passing the surfaces when the landing gear is lowered, it has been found desirable to position orifices 102 and 104 outboard of the main landing gear cut out area 17 for best results. Both pressure $P_1$ obtained from orifice 106 and pressure $P_2$ obtained from orifices 102 and 104 are carried by suitable conduits to a pressure box 44 in a manner and for a purpose that will be more clearly explained hereinafter.

The actuating means for the longitudinal control system of the aircraft shown in FIGURE 2 comprises a normal cable arrangement for pivotally moving elevators 12. Elevators 12 are rotated around pivot point 27 by cables 24 and 26 that ride respectively on pulleys 28 and 30. Pivot point 27 is the point of connection of the elevators to the aircraft. Cables 24 and 26 are moved longitudinally by the pilot control stick 18 through a pivotal connection 20 to the aircraft. Movement of handle 16 rotates stick 18 around pivot point 20. Accordingly, when the pilot handle 16 is moved in a counterclockwise direction, the elevator is rotated in a clockwise direction causing the aircraft to move in a downwardly directed flight path; whereas, when handle 16 is moved clockwise, the aircraft assumes a nose up attitude. An idling link 74 is fixedly connected to the respective cables 24 and 26 at points 76 in a manner that the idling link moves with the movement of the cables by the pilot and is also capable of exerting force to the cables when force is transmitted through rod 72 to the link. The link 74 pivots around a member 78 attached to the aircraft which attachment maintains a steady force transmitting base for the idling link 74.

Figure 3:
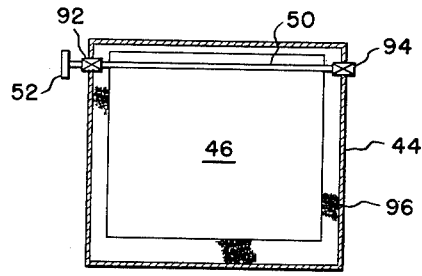
FIGURE 3 is a cross sectional plan view of the pressure box taken along lines III—III of FIGURE 2.

The pressure responsive means comprises a pressure box 44 that is separated by plate 46 into two air-tight compartments 45 and 47. Plate 46 (see FIGURES 2 and 3) is mounted upon a shaft 50 that rides within bearings 92 and 94 mounted in the housing of the pressure box 44. The plate 46 is rotated around its pivotal connection to the housing of the pressure box 44 by the air pressure differential that exists in the two compartments 45 and 47. A pressure conduit 56 conveys static air pressure $P_1$ from the airplane static reference air pressure source 106 (see FIGURE 1) to compartment 47 and conduit 54 conveys air pressure $P_2$ from the air pressure sources 102 and 104 to compartment 45. The air pressure differential between air pressures $P_1$ and $P_2$ cause a torque to be exerted on shaft 50 that is proportional to the air pressure differential and to the area of plate 46. The space between plate 46 and the housing of the pressure box 44 is sealed by a bag-type seal 96 connected between the plate and the housing. The bag-type seal 96 has sufficient slack to permit plate 46 to rotate the desired amount on shaft 50. The housing of the pressure box 44 may be constructed of any suitable material, such as of metallic composition, plastic laminate, or the like. The bag seal 96 may be constructed of rubberized cloth or other suitable material.

The end of shaft 50 extending through bearing 92 is fixedly connected to arm 52. The other end of arm 52 is rotatably connected to rod 58. Rod 58 is in turn connected to bell crank mechanism 62 which pivots around a pivotal connection 66 that is secured to aircraft through stationary link 64. A connecting rod 72 connects leg 70 of the bell crank 62 to idling link 74. It can be seen that the force developed by the pressure responsive means is transmitted through arm 52 and rod 58, rotates bell crank 62 around pivot point 66, and transmits the force through rod 72 to idling link 74. Idling link 74 transmits this force to control cables 24 and 26 to assist the pilot in moving the elevators under the desired conditions.

The main landing gear actuating means (see FIGURE 2) includes an actuating lever 32 and a pulley 36 fixedly connected thereto. Control cables 34 are wound around pulley 36 and connected to lever 32 at point 38. Clockwise rotation of the lever 32 to its operative position, as shown in FIGURE 2, moves control cables 34 in opposite longitudinal directions actuating the main landing gear (not shown). Also connected to the main landing gear lever 32 and wound around pulley 36 and connected at point 38, are cables 40 and 42, which cables are moved in opposite longitudinal directions when the main landing gear is actuated by moving lever 32 in a clockwise direction. Cables 40 and 42 are connected to the bell crank member 62 in a manner to activate the transmission of the force created by the pressure box 44 to the idling link 74 when the landing gear is in the lowered condition as shown.

Figure 4:
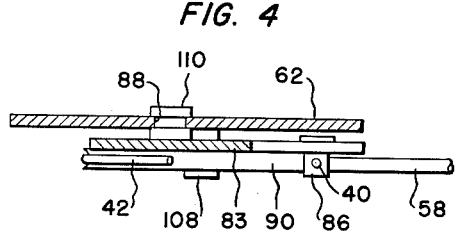
FIGURE 4 is a cross sectional view of a portion of the bell crank control linkage taken along line IV—IV of FIGURE 2.

Bell crank 62 has a first leg 70 to which is connected rod 72 and a second leg 68 on which is rotatably positioned a pulley 90 on shaft 108. Cables 40 and 42 travel around pulleys 80 and 82 and are crossed over to encircle pulley 90. The respective portions of cables 40 and 42, that extend from pulley 90, cross at point 66 or the point of pivotal rotation of the bell crank 62. A first arm 83 is pivotally connected at one end to the bell crank 62 at point 84. The other end of the first arm 83 is pivotally connected to the cable 40 extending from pulley 90 by connector 86 (see FIGURES 2 and 4). Also connected to connector 86 is rod 58 whose other end is pivotally connected to second arm 52 at 60. As can be seen in FIGURES 2 and 4, the longitudinal slot 88 in bell crank member 62 has a bearing pin 110 that is connected to and retains first arm 83 in its spaced position from the bell crank member 62 while permitting arcuate pivotal movement of the other end of arm 83 around pivot point 84 in response to movement of the main landing gear cables 40 and 42.

As shown in FIGURE 2, the main landing gear is in the actuated or extended position. Under this condition cable 40 has moved in a direction away from lever 32 and arm 83 has been rotated to activate the transfer of force from the pressure responsive means 44 to idling link 74. Movement of the main landing gear cable 40 in a direction away from pulley 90 through counterclockwise movement of lever 32 will rotate the other end of arm 83 around pivot point 84 to a point (shown in phantom) adjacent pivot point 66 of bell crank member 62. Under this latter condition the bell crank mechanism is in the "passive" or inactive position, since any longitudinal force exerted on rod 58 operates against the pivot point of bell crank member 62 and is incapable of transferring force of any appreciable magnitude through the bell crank. The other end of first arm 83 is held in the passive condition by cable 40. A return spring arrangement 98 is connected to cable 42 and through a spring 100 tends to pull cable 42 in a longitudinal direction away from the landing gear actuating means 36, thus biasing the landing gear lever 32 in a counterclockwise direction to return the main landing gear to its retracted position.

In operation, the air pressures $P_1$ and $P_2$ are continuously applied to the respective compartments 47 and 45 of the pressure box housing 44. These air pressures exert forces onto plate 46, the sum of which is proportional to the air pressure differentials and is also proportional to the area of plate 46. This force is transmitted through second arm 52 to rod 58. Normally the pressure of air pressure $P_1$ will exceed that of air pressure $P_2$. Accordingly, the air pressure differential against plate 46 will move second arm 52 in a counterclockwise direction causing a pulling force to be exerted onto rod 58. When the main landing gear is extended, cables 40 and 42 will have moved in opposite directions to the point that the end of arm 83 is rotated to its extreme clockwise position that is defined and limited by slot 88. In this position rod 58 exerts a pulling force onto the arm 83 that in turn exerts a pulling force on leg 68 of bell crank 62 and rotates bell crank 62 counterclockwise. This counterclockwise rotation of bell crank member 62 pulls rod 72 longitudinally, torquing idling link 74 in a counterclockwise direction through the first leg 70 of the bell crank 62. Thus, in response to lowering the landing gear by movement of lever 32 to its shown position (see FIGURE 2), the bell crank mechanism 62 is thus placed in an operating or non-passive position.

Air pressure $P_2$ will reflect the change in air pressure of air passing under the wing of the aircraft because of the lowering of the landing gear. This air pressure $P_2$, detected through orifices 102 and 104, creates a force in difference to that force created by air pressure $P_1$ that tends to rotate idling link 74 in a counterclockwise direction. This torque exerted onto cables 24 and 26 causes a force to be exerted on the elevator 12 that assists the pilot in rotating elevator 12 in a clockwise direction around pivot point 27 when the pilot moves the stick 18 in a counterclockwise direction. This clockwise movement of the elevators 12 compensates for the tendency of the aircraft to nose up. When the landing gear is raised to the retracted position, arm 83 is rotated counterclockwise to the point that the bell crank mechanism is placed in a "passive condition" as hereinbefore described. It is to be noted that when the bell crank mechanism is in the passive condition, it is capable of moving about pivot point 66 with relatively little drag from the pressure responsive means that includes rod 58 and the force creating means of pressure box 44. Accordingly, no appreciable load is placed on the actuating means of the longitudinal control system by the trim compensation system when the landing gear is in the raised position.

In the preferred embodiment, it is shown that individual orifices on each wing are used to detect air pressure $P_2$. This air pressure $P_2$ is then applied to the upper compartment 45 of pressure box 44. While a plurality of air pressures $P_2$ are detected, they are averaged out to a given pressure $P_2$. Under this arrangement, if only one main gear extends, the composite $P_2$ pressure will average out to a value that represents the nose up effect of the extending of one landing gear. It should also be noted that only one air pressure detecting orifice 104 could be used. However, the degree of compensation effected would not be as accurately related to the nose up effect occurring as is the case where two detecting orifices 104 are used. The present system has the advantage that pressure $P_2$ is able to build up smoothly in compartment 45 as the landing gear rotates into its extended position. The system is not appreciably disturbed by pressure fluctuations in the wheel cavities of the aircraft when the doors open and close, since the force imparted to the longitudinal control systems is one of gradual build up. As long as the landing gear is in the extended position the aircraft will continue to be trimmed through the added force on the control cables that reduces that force the pilot is required to exert to maintain the aircraft at a given attitude.

Having described our invention, what we claim is:

1. A landing gear trim compensation system for use in aircraft having a retractable landing gear that may be raised and lowered comprising, means for detecting the pressure differential between the static source air pressure of said aircraft in flight and the air pressure of the air disrupted by the lowering of said landing gear and for converting said pressure differential into a force proportional to said differential, force transmitting means responsive to said force for aiding in the control of the longitudinal pitch of said aircraft, and means for inactivating said force transmitting means upon said landing gear being raised.

2. A landing gear trim compensation system for use in aircraft having a retractable landing gear that may be raised and lowered comprising, detecting means for obtaining the pressure differential between the static source air pressure of said aircraft and the pressure of air flowing past the airfoil of said aircraft that is disrupted by the the lowering of said landing gear, pressure responsive means responsive to said pressure differential for creating a force substantially proportional to said pressure differential, force transmitting means responsive to said force for effecting a control on the in flight attitude of said aircraft, and means operatively connected to said landing gear for inactivating said force transmitting means upon raising said landing gear.

3. A landing gear trim compensation system for use in aircraft having a retractable landing gear comprising, a first source of static air pressure of the aircraft, a second source of air pressure having a pressure that reflects the change in the pressure of air adjacent the airfoil surfaces of said aircraft that occurs when said landing gear is extended by said aircraft in flight, pressure responsive means responsive to said air pressures from said first source and said second source for creating force in response to differentials of air pressure from said sources, actuating means for actuating the longitudinal control surfaces of said aircraft, landing gear actuating means for controlling the raising and lowering of said landing gear, force transmitting means for transmitting force from said pressure responsive means to said actuating means that aids in actuating said actuating means, and means controlled by said landing gear actuating means for making said force transmitting means incapable of transmitting force from said pressure responsive means to said actuating means when said landing gear is retracted.

4. A landing gear trim compensation system for use in aircraft having a retractable landing gear comprising, a first source of static air pressure of the aircraft, a second source of air pressure having a pressure that reflects the change in the pressure of air adjacent the airfoil surfaces of said aircraft that occurs when said landing gear is extended by said aircraft in flight, pressure responsive means responsive to said air pressure from said first source and said second source for creating force in response to differentials of air pressure from said sources, actuating means for actuating the longitudinal control surfaces of said aircraft, landing gear actuating means for controlling the raising and lowering of said landing gear, force transmitting means including a bell crank mechanism for transmitting force from said pressure responsive means to said actuating means that aids in actuating said actuating means, and means controlled by said landing gear actuating means for making said force transmitting means incapable of transmitting force from said pressure responsive means to said actuating means when said landing gear is retracted.

5. A landing gear trim compensation system for use in aircraft having a retractable landing gear comprising, a first source of static air pressure of the aircraft, a second source of air pressure having a pressure that reflects the change in the pressure of air adjacent the airfoil surfaces of said aircraft that occurs when said landing gear is extended by said aircraft in flight, pressure responsive means responsive to said air pressures from said first source and said second source for creating force in response to differentials of air pressure from said sources, said pressure responsive means including a housing separated into two substantially air-tight compartments separated by a movable plate, means for applying air pressure from said first source to one of said compartments and from said second source to the other of said compartments, actuating means for actuating the longitudinal control surfaces of said aircraft, landing gear actuating means for controlling the raising and lowering of said landing gear, force transmitting means for transmitting force from said pressure responsive means to said actuating means that aids in actuating said actuating means, and means controlled by said landing gear actuating means for making said force transmitting means incapable of transmitting force from said pressure responsive means to said actuating means when said landing gear is retracted.

6. A landing gear trim compensation system for use in aircraft having elevators and a retractable landing gear that when lowered tends to effect a change in the in flight attitude of said aircraft comprising, first means for obtaining air having a pressure of that air encountered by said aircraft in flight, second means located on the under surface of at least one airfoil of said aircraft for receiving air having a change in pressure reflecting the lowering of said landing gear, pressure responsive means for creating force proportional to differentials of air pressure received by said first means and said second means, said pressure responsive means including a housing separated into two substantially air-tight compartments separated by a movable plate, means for applying air pressure from said first means to one of said compartments and from said second means to the other of said compartments, elevator actuating means for controlling the position of said elevators, landing gear actuating means for controlling raising and lowering of said landing gear, bell crank means connected to said plate of said pressure responsive means and to said elevator actuating means for applying to said elevator actuating means a force proportional to said force created by said pressure responsive means, said bell crank means having means responsive to actuation of said landing gear actuating means for inactivating the transfer of force by said bell crank means to said elevator actuating means when said landing gear is raised.

7. A landing gear trim compensation system for use in aircraft having elevators and a retractable landing gear that when lowered tends to effect a change in the in flight attitude of said aircraft comprising, first means for obtaining air having a pressure of that air encountered by the forward portion of said aircraft in flight, second means located on the under surface of at least one airfoil of said aircraft for obtaining air having a change in pressure caused by the lowering of said landing gear, pressure responsive means including a movable plate being responsive to air pressure from said first means and said second means for creating force proportional to the difference between the air pressures of said first means and said second means and proportional to the area of said plate, elevator actuating means for controlling the position of said elevators, landing gear actuating means including at least one control cable for controlling the raising and lowering of said landing gear, a bell crank member having first leg and second leg portions being pivotally connected to said aircraft at the intersecting portion of said legs, force transmitting means connecting the end of said first leg portion to said elevator actuating means for transmitting force from said bell crank member to aid said elevator actuating means in moving said elevators, a pulley rotatably connected to the end of said second leg portion of said bell crank member, said cable in said landing gear actuating means encircling said pulley with respective portions of said cable extending from said pulley crossing one over the other at substantially the pivot point of said connection of said bell crank member to said aircraft, a first arm pivotally connected to said bell crank member at a point substantially midway between said ends of said first and second leg portions, the other end of said first arm being rotatably connected to one of the portions of said cable in said landing gear means that extends from said pulley, a second arm being fixedly connected to said movable plate, the other end of said second arm being connected through a force transmitting linkage to said other end of said first arm, said cable portion being movable around said pulley by actuating said landing gear actuating means causing said other end of said first arm to move selectively between the point of pivotal connection of said bell crank and a point adjacent said end of said second leg portion.

8. A landing gear trim compensation system for use in aircraft having elevators and a retractable landing gear that when lowered while the aircraft is in flight tends to effect a change in the relative pressures of air passing underneath the control surfaces of said aircraft comprising, static tube means positioned near the forward portion of the fuselage of said aircraft for receiving air having a static pressure of that air encountered by said aircraft in flight, flush mounted tube means located on the under sides of the wing surfaces of said aircraft and positioned outboard of said landing gear for receiving air having a still pressure of that air passing adjacent thereto, pressure responsive means for creating a force proportional to differentials of air pressure received from said static tube means and said flush mounted tube means, said pressure responsive means including a pressure box having a plate positioned therein that separates said box into two compartments, means for sealing the space between the outer periphery of said plate and said box making said two compartments substantially air tight, said plate being fixedly connected at one side to a shaft, said shaft being rotatably secured to said box at one side of said box in a manner to allow said plate to pivot within said box and rotate said shaft, said shaft being carried by said box on bearings with at least one end of said shaft extending through the wall of said box, elevator actuating means including at least one control cable for controlling the position of the elevators of said aircraft, landing gear actuating means including at least one control cable for controlling the raising and lowering of said landing gear, a bell crank member having first and second leg portions and being pivotally connected to said aircraft at the intersecting portion of said legs, force transmitting linkage means connecting the end of said first leg portion to said control cable in said elevator actuating means for transmitting force from said bell crank member to said cable, a pulley rotatably connected to the end of said second leg portion of said bell crank member, said cable in said landing gear actuating means encircling said pulley and respective portions of said cable extending from said pulley crossing one over the other at the pivot point of said connection of said bell crank member to said aircraft, a first arm pivotally connected to said bell crank member at a point substantially midway between said ends of said first and second leg portions, the other end of said first arm being rotatably connected to one of the portions of said cable in said landing gear means that extends from said pulley, a second arm being fixedly connected at one end to said shaft, the other end of said second arm being connected through a force transmitting linkage to said other end of said first arm at the point of said connection of said other end of said first arm to said cable portion, said cable portion being movable around said pulley by actuating said landing gear actuating means moving said other end of said first arm selectively between a point in line with the pivotal connection of said bell crank and a point adjacent said end of said second leg portion, and means for applying air pressure from said static tube means to one of said compartments and for applying air from said flush mounted tube means to the other of said compartments.

9. A landing gear trim compensation system for use in aircraft having a retractable landing gear comprising, means for detecting the pressure differential between the static source air pressure of said aircraft in flight and the air pressure of the air disrupted by the lowering of said landing gear and for converting said pressure differential into a force proportional to said differential, force transmitting means responsive to said force for aiding in the control of the longitudinal pitch of said aircraft, landing gear actuating means for controlling the raising and lowering of said landing gear, and means connected with said landing gear actuating means for inactivating said force transmitting means when said landing gear means is operated to raise said landing gear.

No references cited.